(12) United States Patent
Won

(10) Patent No.: US 11,924,798 B2
(45) Date of Patent: Mar. 5, 2024

(54) METHOD, APPARATUS, AND COMPUTER PROGRAM PRODUCT FOR EXPEDITING AN EMERGENCY SERVICES INITIATION

(71) Applicant: NOKIA TECHNOLOGIES OY, Espoo (FI)

(72) Inventor: Sung Hwan Won, Flower Mound, TX (US)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/249,782

(22) Filed: Mar. 12, 2021

(65) Prior Publication Data

US 2021/0321356 A1 Oct. 14, 2021

Related U.S. Application Data

(60) Provisional application No. 63/007,097, filed on Apr. 8, 2020.

(51) Int. Cl.
| | | |
|---|---|---|
| *H04W 60/02* | (2009.01) | |
| *H04W 4/90* | (2018.01) | |
| *H04W 84/04* | (2009.01) | |

(52) U.S. Cl.
CPC ............. *H04W 60/02* (2013.01); *H04W 4/90* (2018.02); *H04W 84/042* (2013.01)

(58) Field of Classification Search
CPC ....... H04W 4/90; H04W 60/02; H04W 76/19; H04W 76/24; H04W 76/38; H04W 76/50; H04W 84/042
See application file for complete search history.

(56) References Cited

U.S. PATENT DOCUMENTS 10,791,450 B1 * 9/2020 Bakker .................. H04W 48/18
10,869,234 B2 * 12/2020 Velev ................ H04W 36/0058
(Continued)

FOREIGN PATENT DOCUMENTS

| CN | 110870354 A | 3/2020 |
| JP | 2020025212 A | 2/2020 |

OTHER PUBLICATIONS

"3rd Generation Partnership Project: Technical Specification Group Core Network and Terminals; Non-Access-Stratum (NAS) Protocol for 5G System (5GS); Stage 3; (Release 16)", 3GPP TS 24.501 v16.4.1 (Mar. 2020), 666 pages.
(Continued)

*Primary Examiner* — Jean A Gelin
(74) *Attorney, Agent, or Firm* — ALSTON & BIRD LLP

(57) ABSTRACT

A method, apparatus, and computer program product provide enhanced emergency services fallback procedures. The user equipment may indicate the emergency services fallback within the registration request message to a network entity, such as the access and mobility management function. Upon receiving the registration request message the emergency services fallback procedure is triggered. The user equipment receives an indication, such as via an access stratum layer and the received indication is considered, such as by the non-access stratum layer in the user equipment, as the registration response message. The user equipment is configured to respond differently upon receiving differently configured registration response rejection messages or upon expiration of a response timer.

20 Claims, 11 Drawing Sheets

(56) References Cited

U.S. PATENT DOCUMENTS

| | | | | |
|---|---|---|---|---|
| 11,252,781 | B2* | 2/2022 | Takakura | H04L 65/1016 |
| 2010/0112394 | A1* | 5/2010 | Yamamoto | C01B 3/32 |
| | | | | 422/600 |
| 2010/0297979 | A1* | 11/2010 | Watfa | H04W 8/205 |
| | | | | 455/404.1 |
| 2011/0026687 | A1* | 2/2011 | Smelyansky | H04L 12/66 |
| | | | | 370/352 |
| 2013/0285855 | A1* | 10/2013 | Dupray | G01S 19/48 |
| | | | | 342/451 |
| 2013/0290459 | A1* | 10/2013 | Cuff | H04L 51/226 |
| | | | | 709/207 |
| 2019/0159108 | A1 | 5/2019 | Lee et al. | |
| 2019/0281506 | A1* | 9/2019 | Chiang | H04W 76/19 |
| 2020/0015128 | A1* | 1/2020 | Stojanovski | H04W 76/50 |
| 2020/0120470 | A1* | 4/2020 | Arshad | H04W 8/065 |
| 2020/0120485 | A1* | 4/2020 | Abtin | H04W 8/24 |
| 2020/0275513 | A1* | 8/2020 | Park | H04W 76/22 |
| 2020/0314701 | A1* | 10/2020 | Talebi Fard | H04W 36/0033 |
| 2020/0413298 | A1* | 12/2020 | Ke | H04L 65/1095 |
| 2021/0176817 | A1* | 6/2021 | Takakura | H04L 65/1073 |
| 2021/0267001 | A1* | 8/2021 | Takakura | H04W 76/18 |
| 2021/0392574 | A1* | 12/2021 | Tiwari | H04W 68/12 |
| 2022/0078871 | A1* | 3/2022 | Won | H04W 76/27 |
| 2022/0124869 | A1* | 4/2022 | Keller | H04W 36/0022 |
| 2022/0174464 | A1* | 6/2022 | Ohlsson | H04W 48/12 |
| 2022/0377613 | A1* | 11/2022 | Watfa | H04W 28/0908 |

OTHER PUBLICATIONS

"3rd Generation Partnership Project; Technical Specification Group Services and System Aspects; Procedures for the 5G System (5GS): Stage 2 (Release 16)", 3GPP TS 23.502 v16.4.0 (Mar. 2020), 582 pages.

"3rd Generation Partnership Project; Technical Specification Group Services and System Aspects: IP Multimedia Subsystem (IMS) emergency sessions (Release 15)", 3GPP TS 23.167 v15.6.0 (Dec. 2019), 66 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 v15.9.0, (Mar. 2020), 964 pages.

"3rd Generation Partnership Project: Technical Specification Group Radio Access Network; NR; User Equipment (UE) procedures in Idle mode and RRC Inactive state (Release 15)", 3GPP TS 38.304 v15.6.0 (Dec. 2019), 30 pages.

"3rd Generation Partnership Project; Technical Specification Group Core Network and Terminals: IP multimedia call control protocol based on Session Initiation Protocol (SIP) and Session Description Protocol (SDP); Stage 3 (Release 16)", 3GPP TS 24.229 v16.5.0 (Mar. 2020), 1,066 pages.

International Search Report and Written Opinion for Patent Cooperation Treaty Application No. PCT/EP2021/051049 dated Mar. 3, 2021, 15 pages.

Vivo, "Clarification of the Figure of Registration Procedure", 3GPP TSG-CT WG1 Meeting #121bis-e. C1ah-200153, Jan. 16-22, 2020, 16 pages.

BlackBerry UK Ltd., "Clarify ESFB", 3GPP TSG-SA2 Meeting #136-AH, S2-2001283, Jan. 13-17, 2020, 6 pages.

Extended European Search Report for European Application No. 21152319.6 dated Jul. 2, 2021, 11 pages.

Office Action for Taiwanese Application No. 110109776 dated Mar. 8, 2022, 8 pages.

Office Action for European Application No. 21152319.6 dated Jun. 3, 2022, 5 pages.

Office Action for European Application No. 21152319.6 dated Dec. 6, 2022, 5 pages.

Office Action for Taiwanese Application No. 110109776 dated Aug. 24, 2022, 8 pages.

Notice of Allowance for Taiwan Application No. 110109776 dated Apr. 26, 2023, 3 pages.

Office Action for European Application No. 21152319.6 dated May 9, 2023, 6 pages.

Office Action for Japanese Application No. 2022-560970 dated Jun. 19, 2023, 5 pages.

Sharp, "AMF Setting EMF Based on UE's Capability/Operator Policy", 3GPP TSG-CT WG1 Meeting #111bis, C1-184400, 24.501 CR 0152, (Jul. 9-13, 2018), 17 pages.

* cited by examiner

700b

```
5GS registration type value (octet 1, bits 1 to 3)
Bits
3 2 1
0 0 1     initial registration
0 1 0     mobility registration updating
0 1 1     periodic registration updating
1 0 0     emergency registration
1 0 1     emergency services fallback
1 1 1     reserved All other values are unused and shall be interpreted as "initial registration", if received
by the network.

Follow-on request bit (FOR) (octet 1, bit 4)
Bit
4
0         No follow-on request pending
1         Follow-on request pending
```

Figure 7b

METHOD, APPARATUS, AND COMPUTER PROGRAM PRODUCT FOR EXPEDITING AN EMERGENCY SERVICES INITIATION

CROSS-REFERENCE TO RELATED APPLICATION

The present application claims priority to, and the benefit of, U.S. Provisional Application Ser. No. 63/007,097, titled "Method, Apparatus, And Computer Program Product For Expediting An Emergency Services Initiation" and filed on Apr. 8, 2020, the entire disclosure of which is incorporated herein by reference in its entirety for all purposes.

TECHNOLOGICAL FIELD

An example embodiment relates generally to supporting and expediting the initiation of an emergency services fallback procedure for user equipment across a communication network, such as a $3^{rd}$ generation partnership project (3GPP) $5^{th}$ generation (5G) communication network.

BACKGROUND

A communication system can be seen as a facility that enables communication sessions between two or more entities such as user equipment, base stations/access points, Network Functions (NF), and/or other nodes by providing connectivity between the various entities involved in the communication path. A communication system can be provided, for example, with a communication network and one or more compatible communication devices. Telecommunication networks continue to evolve and the $5^{th}$ generation of mobile networks (5G networks) is now expected to be the next major phase of mobile telecommunication standards and to bring many improvements in the mobile network user experience. For instance, 5G networks should provide new technical solutions allowing a greater throughput, lower latency, higher reliability, higher connectivity, and higher mobility range. In addition to these improvements in terms of performance, 5G networks are also expected to extend the flexibility in the network usage and to provide users with a wider range of use cases and business models.

The $3^{rd}$ Generation Partnership Project (3GPP) is a standards organization which develops protocols for mobile telephony and is known for the development and maintenance of various standards including $2^{nd}$ generation (2G), $3^{rd}$ generation (3G), $4^{th}$ generation (4G), Long Term Evolution (LTE), and $5^{th}$ generation (5G) standards. The 5G network has been designed as a Service Based Architecture (SBA), e.g., a system architecture in which the system functionality is achieved by a set of NFs providing services to other authorized NFs to access their services. The 5G network allows for the support of emergency services fallback registration between a User Equipment (UE) and an Access and Mobility Management Function (AMF).

The UE initially registers with the AMF and maintains communication through periodic registration updates. If the registration procedure for mobility and periodic registration update fail due to a missing response from the network, or due to current 3GPP rejection standards, then no additional mobility management procedures can be initiated by the UE except subsequent attempts to initiate the registration procedure. Due to this limitation, the registration procedure was enhanced so that the UE can include an allowed Protocol Data Unit (PDU) session status Information Element (IE) in the registration request. With this enhancement, if the registration procedure was initiated due to particular 3GPP standards and there is a PDU session which has been associated with non-3GPP access, and is allowed by the UE to be transferred to 3GPP access, then Data Link (DL) data of the PDU session can be transferred to 3GPP access directly via the registration procedure.

However, the enhanced registration procedure has not been made available for the emergency services fallback procedure. As such, the UE needs to perform the registration procedure and then the service request procedure to make the AMF trigger the emergency services fallback procedure. In instances in which the registration procedure or the periodic registration updates fail, access for the emergency services fallback procedure is correspondingly delayed.

BRIEF SUMMARY

A method, apparatus, and computer program product are disclosed to enhance the emergency services fallback procedure. The emergency services fallback procedure is initiated during the registration update procedure without the UE having to first complete the registration update procedure prior to then separately initiating and completing the emergency services fallback procedure. As a result, access to the emergency services fallback procedure may be advantageously expedited, such as in instances in which the registration update procedure has failed.

In an example embodiment, a method is provided that includes, during a registration update procedure, causing a registration request to be sent comprising at least a registration type value that indicates an emergency services fallback request. The method also includes determining a response to the registration request including the emergency services fallback request.

In an example embodiment, a method is provided wherein the registration request to be sent further comprises a follow-on request bit defining that no follow-on request is pending. In an example embodiment, a method is provided wherein determining the response to the registration request comprises determining that the emergency services fallback request has been accepted in an instance in which a mode has changed or a connection has been established with a network. In an example embodiment, a method is provided further comprising starting a timer when the registration request is caused to be sent; and stopping the timer upon determining that the emergency services fallback request has been accepted. In an example embodiment, a method is provided wherein determining the response to the registration request comprises determining that the emergency services fallback request has not been accepted. In an example embodiment, a method is provided wherein in response to a predefined cause value being provided in response to the registration request, the method further comprises selecting a cell connected to an evolved packet core (EPC) or a 5G core network (5GCN). The method also includes initiating communication via the cell. In an example embodiment, a method is provided further comprising starting a timer when the communication via the cell is caused to be sent; and stopping the timer upon determining that the communication via the cell has been accepted.

In an example embodiment, a method is provided that includes starting a timer when the registration request is caused to be sent. The method also includes determining a predefined time limit is expired since starting the timer. The method also includes, in response to expiration of the predefined time limit, causing an emergency services fallback attempt failure notification to be sent to a client.

In an example embodiment, a method is provided that includes, during a registration update procedure, receiving a registration request comprising at least a registration type value that indicates an emergency services fallback request. The method also includes causing a response to the registration request to be provided.

In an example embodiment, a method is provided wherein the response to the registration request defines an acceptance of the emergency services fallback request. In an example embodiment, a method is provided wherein the response to the registration request defines a denial of the emergency services fallback request. In an example embodiment, a method is provided wherein the response to the registration request further includes a predefined cause value for the denial.

In an example embodiment, an apparatus is provided that comprises at least one processor; and at least one memory including computer program code with the at least one memory and the computer program code configured to, with the at least one processor, cause the apparatus to, during a registration update procedure, cause a registration request to be sent comprising at least a registration type value that indicates an emergency services fallback request. The apparatus is also caused to determine a response to the registration request including the emergency services fallback request.

In an example embodiment, an apparatus that comprises at least one processor and at least one memory including computer program code is provided, wherein the registration request to be sent further comprises a follow-on request bit defining that no follow-on request is pending. In an example embodiment, an apparatus is provided wherein determining the response to the registration request comprises determining that the emergency services fallback request has been accepted in an instance in which a mode has changed or a connection has been established with a network. In an example embodiment, the apparatus is also caused to start a timer when the registration request is caused to be sent. In an example embodiment, the apparatus is also caused to stop the timer upon determining that the emergency services fallback request has been accepted. In an example embodiment, an apparatus is provided wherein determining the response to the registration request comprises determining that the emergency services fallback request has not been accepted. In an example embodiment, an apparatus is provided wherein, in response to a predefined cause value being provided in response to the registration request, the apparatus is also caused to select a cell connected to an evolved packet core (EPC) or a 5G core network (5GCN). The apparatus is also caused to initiate communication via the cell. In an example embodiment the apparatus is also caused to start a timer when the communication via the cell is caused to be sent. In an example embodiment, the apparatus is also caused to stop the timer upon determining that the communication via the cell has been accepted.

In an example embodiment, an apparatus is provided that comprises at least one processor; and at least one memory including computer program code with the at least one memory and the computer program code configured to, with the at least one processor, cause the apparatus to start a timer when the registration request is caused to be sent. The apparatus is also caused to determine a predefined time limit is expired since starting the timer. The apparatus is also caused, in response to expiration of the predefined time limit, to cause an emergency services fallback attempt failure notification to be sent to a client.

In an example embodiment, an apparatus is provided that comprises at least one processor; and at least one memory including computer program code with the at least one memory and the computer program code configured to, with the at least one processor, cause the apparatus to, during a registration update procedure, receive a registration request comprising at least a registration type value that indicates an emergency services fallback request. The apparatus is also caused to cause a response to the registration request to be provided.

In an example embodiment, an apparatus that comprises at least one processor and at least one memory including computer program code is provided, wherein the response to the registration request defines an acceptance of the emergency services fallback request. In an example embodiment, an apparatus is provided wherein the response to the registration request defines a denial of the emergency services fallback request. In an example embodiment, an apparatus is provided wherein the response to the registration request further includes a predefined cause value for the denial.

In an example embodiment, a computer program product is provided that comprises a non-transitory computer readable storage medium having program code portions stored thereon with the program code portions configured, upon execution, to, during a registration update procedure, cause a registration request to be sent comprising at least a registration type value that indicates an emergency services fallback request. The program code portions are also configured to determine a response to the registration request including the emergency services fallback request.

In an example embodiment, a computer program product, that comprises a non-transitory computer readable storage medium having program code portions stored thereon, is provided wherein the registration request to be sent further comprises a follow-on request bit defining that no follow-on request is pending. In an example embodiment, a computer program product is provided wherein determining the response to the registration request comprises determining that the emergency services fallback request has been accepted in an instance in which a mode has changed or a connection has been established with a network. In an example embodiment, the program code portions are also configured to start a timer when the registration request is caused to be sent. In an example embodiment, the program code portions are also configured to stop the timer upon determining that the emergency services fallback request has been accepted. In an example embodiment, a computer program product is provided wherein determining the response to the registration request comprises determining that the emergency services fallback request has not been accepted. In an example embodiment, a computer program product is provided wherein in response to a predefined cause value being provided in response to the registration request, the program code portions are also configured to select a cell connected to an evolved packet core (EPC) or a 5G core network (5GCN). The program code portions are also configured to initiate communication via the cell. In an example embodiment, the program code portions are also configured to start a timer when the communication via the cell is caused to be sent. In an example embodiment, the program code portions are also configured to stop the timer upon determining that the communication via the cell has been accepted.

In an example embodiment, a computer program product is provided that comprises a non-transitory computer readable storage medium having program code portions stored thereon with the program code portions configured, upon execution, to start a timer when the registration request is caused to be sent. The program code portions are also configured to determine a predefined time limit is expired since starting the timer. The program code portions are also configured to, in response to expiration of the predefined time limit, cause an emergency services fallback attempt failure notification to be sent to client.

In an example embodiment, a computer program product is provided that comprises a non-transitory computer readable storage medium having program code portions stored thereon with the program code portions configured, upon execution, to, during a registration update procedure, receive a registration request comprising at least a registration type value that indicates an emergency services fallback request. The program code portions are also configured to cause a response to the registration request to be provided.

In an example embodiment, a computer program product, that comprises a non-transitory computer readable storage medium having program code portions stored thereon, is provided wherein the response to the registration request defines an acceptance of the emergency services fallback request. In an example embodiment, a computer program product is provided wherein the response to the registration request defines a denial of the emergency services fallback request. In an example embodiment, a computer program product is provided wherein the response to the registration request further includes a predefined cause value for the denial.

In an example embodiment, an apparatus is provided that includes means for, during a registration update procedure, causing a registration request to be sent comprising at least a registration type value that indicates an emergency services fallback request. The apparatus also includes means for determining a response to the registration request including the emergency services fallback request.

In an example embodiment, an apparatus is provided that includes means for the registration request to be sent further comprises a follow-on request bit defining that no follow-on request is pending. In an example embodiment, an apparatus is provided that includes means for determining the response to the registration request comprises determining that the emergency services fallback request has been accepted in an instance in which a mode has changed or a connection has been established with a network. In an example embodiment, an apparatus is provided that includes means for starting a timer when the registration request is caused to be sent. In an example embodiment, an apparatus is provided that includes means for stopping the timer upon determining that the emergency services fallback request has been accepted. In an example embodiment, an apparatus is provided that includes means for determining the response to the registration request comprises determining that the emergency services fallback request has not been accepted. In an example embodiment, an apparatus is provided wherein, in response to a predefined cause value being provided in response to the registration request, the apparatus further includes means for selecting a cell connected to an evolved packet core (EPC) or a 5G core network (5GCN). The apparatus also includes means for initiating communication via the cell. In an example embodiment, an apparatus is provided that includes means for starting a timer when the communication via the cell is caused to be sent. In an example embodiment, an apparatus is provided that includes means for stopping the timer upon determining that the communication via the cell has been accepted.

In an example embodiment, an apparatus is provided that includes means for starting a timer when the registration request is caused to be sent. The apparatus also includes means for determining a predefined time limit is expired since starting the timer. The apparatus also includes means for, in response to expiration of the predefined time limit causing an emergency services fallback attempt failure notification to be sent to a client.

In an example embodiment, an apparatus is provided that includes means for, during a registration update procedure, receiving a registration request comprising at least a registration type value that indicates an emergency services fallback request. The apparatus also includes means for causing a response to the registration request to be provided.

In an example embodiment, an apparatus is provided wherein the response to the registration request defines an acceptance of the emergency services fallback request. In an example embodiment, an apparatus is provided wherein the response to the registration request defines a denial of the emergency services fallback request. In an example embodiment, an apparatus is provided wherein the response to the registration request further includes a predefined cause value for the denial.

Various other aspects are also described in the following detailed description and in the attached claims.

BRIEF DESCRIPTION OF THE DRAWINGS

Figure 1:
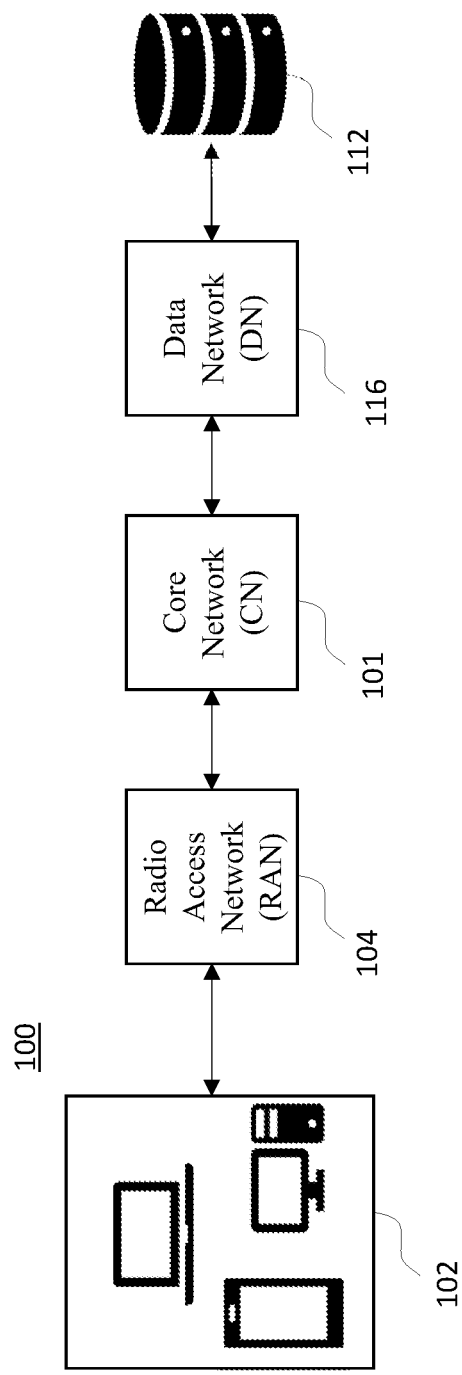
Figure 2:
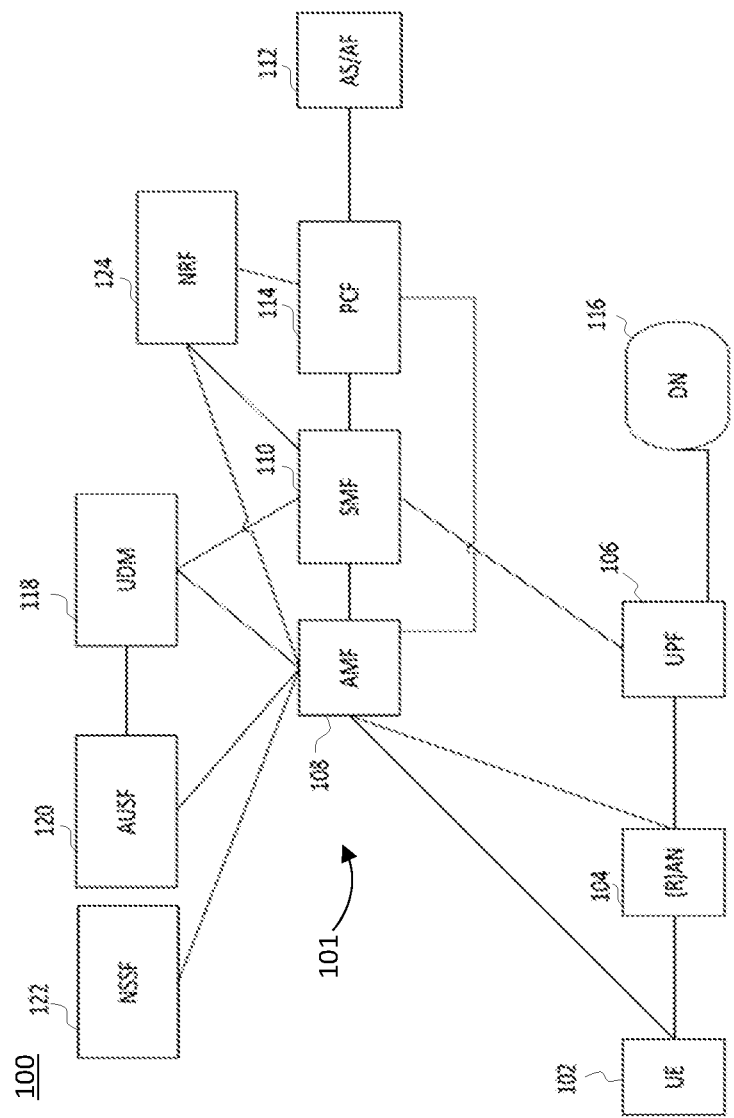
Figure 3:
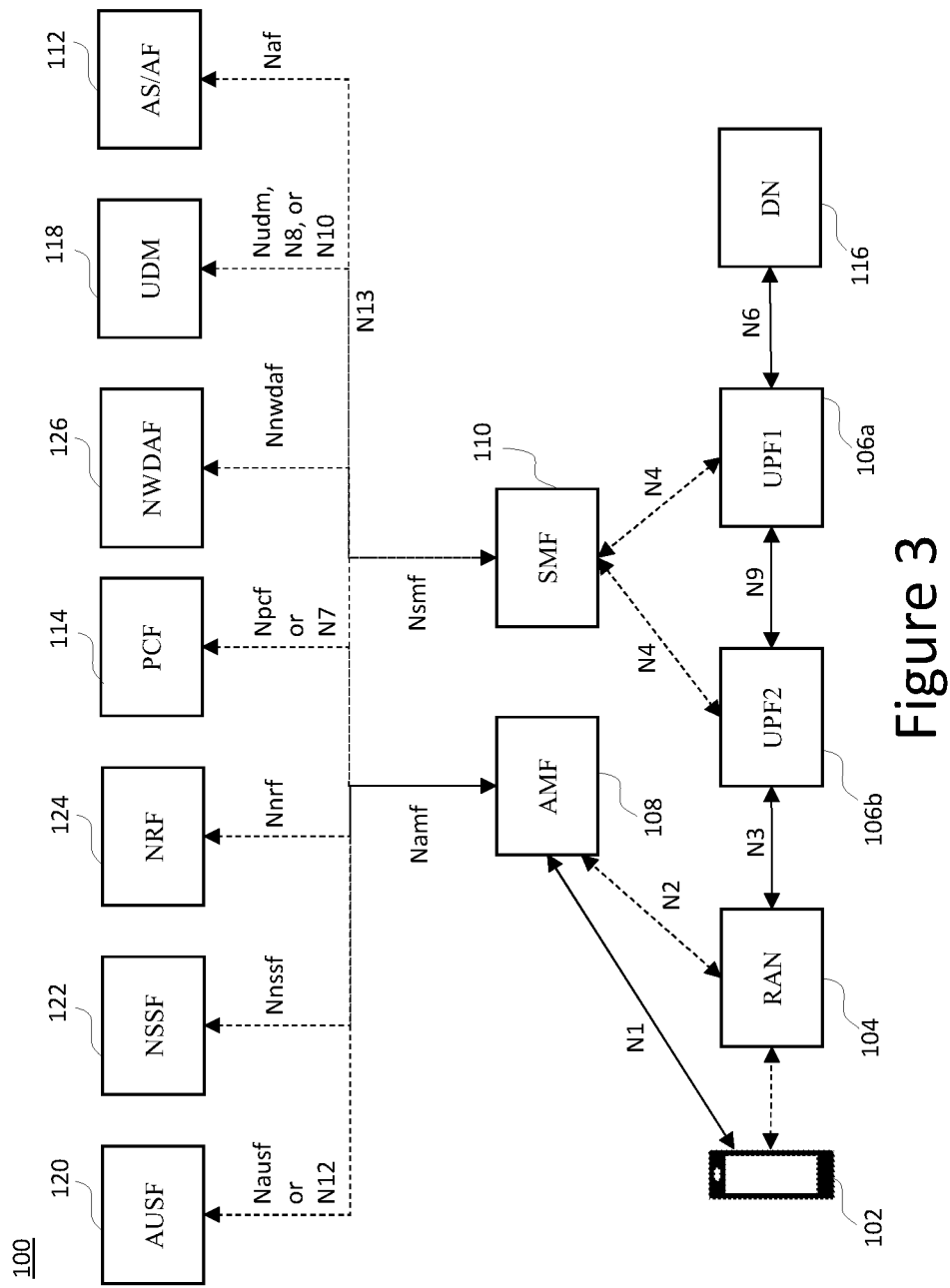
Figure 4:
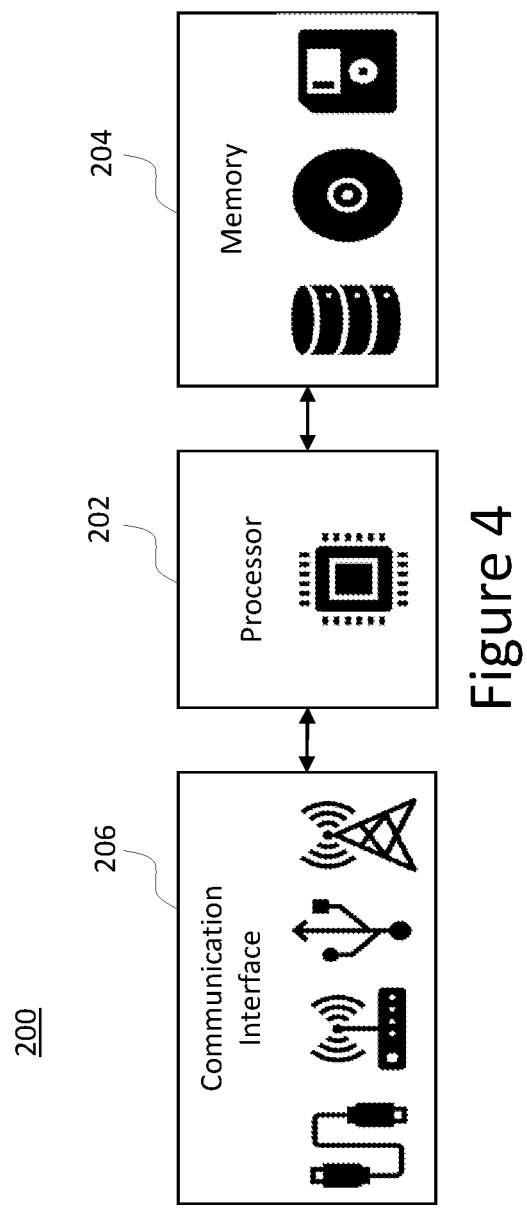
Figure 5:
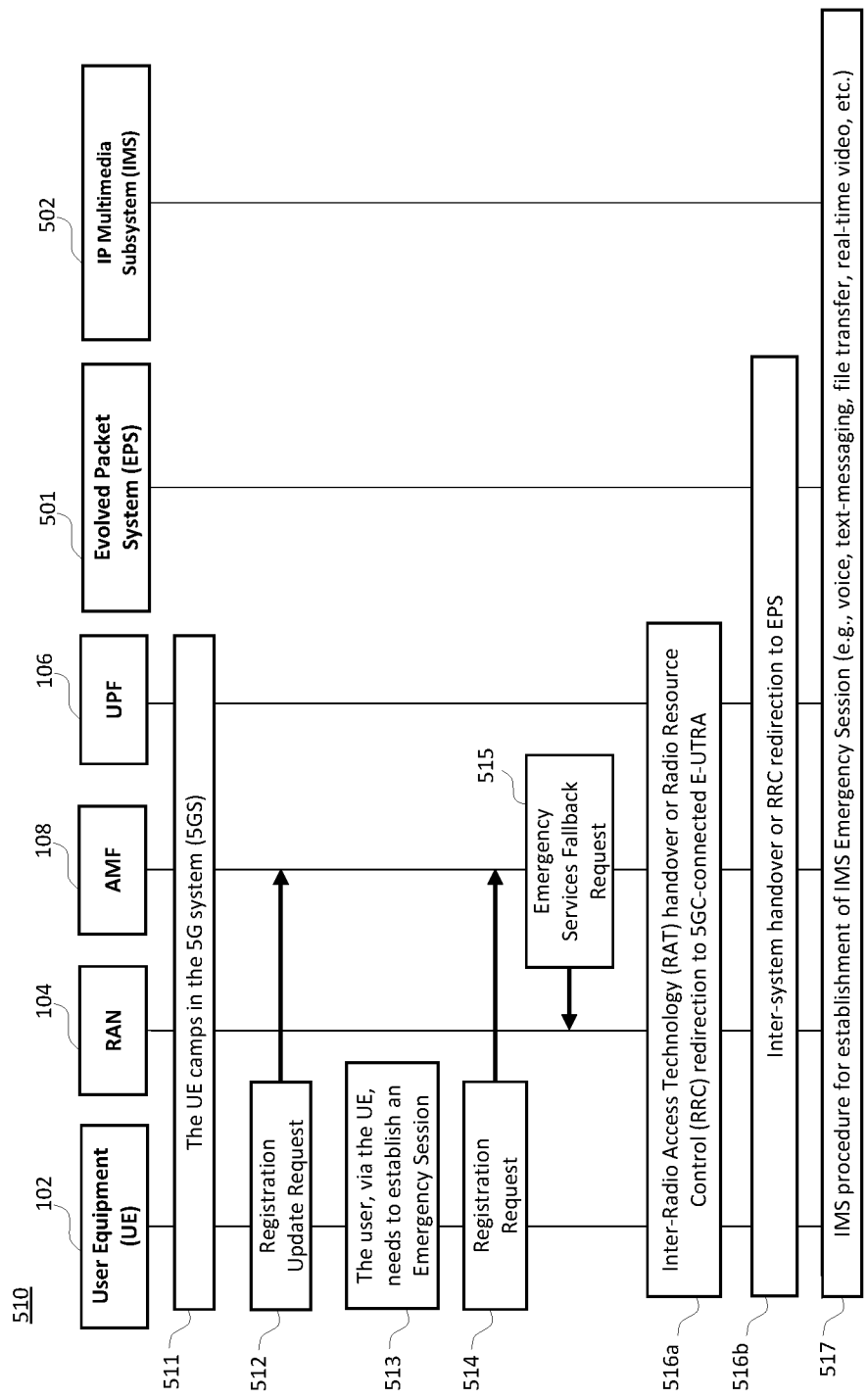
Figure 6:
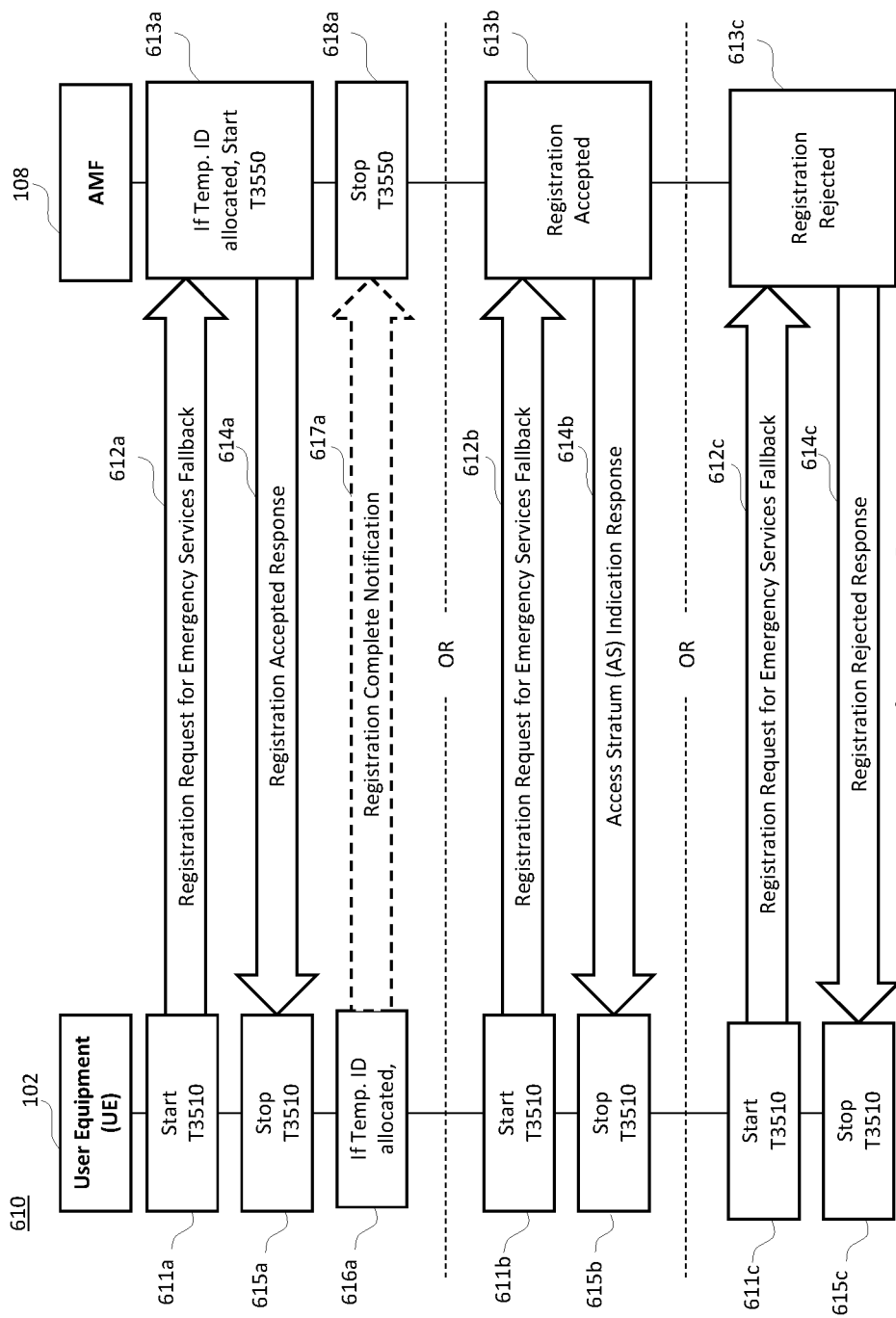
Figure 7A:
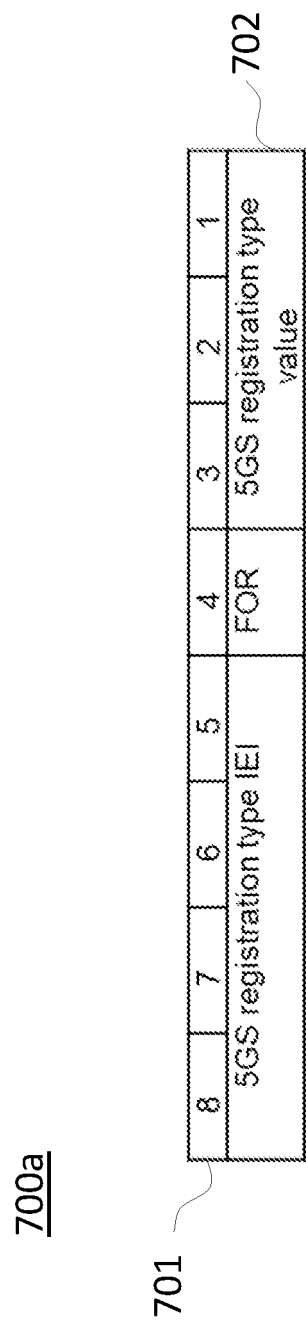

Having thus described embodiments of the disclosure in general terms, reference will now be made to the accompanying drawings, which are not necessarily drawn to scale, and wherein:

FIG. 1 illustrates an example architecture for a communications network, according to some embodiments;

FIG. 2 illustrates an example architecture for a communications network, according to some embodiments;

FIG. 3 illustrates an example architecture for a communications network, according to some embodiments;

FIG. 4 illustrates an example computing device for communicating over communication networks with other network entities, according to some embodiments;

FIG. 5 illustrates an example signal flow diagram of a user communication device interfaced with a plurality of network functions, according to some embodiments;

FIG. 6 illustrates an example communication process between a UE and an AMF, according to some embodiments;

FIG. 7a illustrates a configuration of a registration type information element, according to some embodiments;

FIG. 7b illustrates a configuration of a registration type values table, according to some embodiments.

Figure 8:
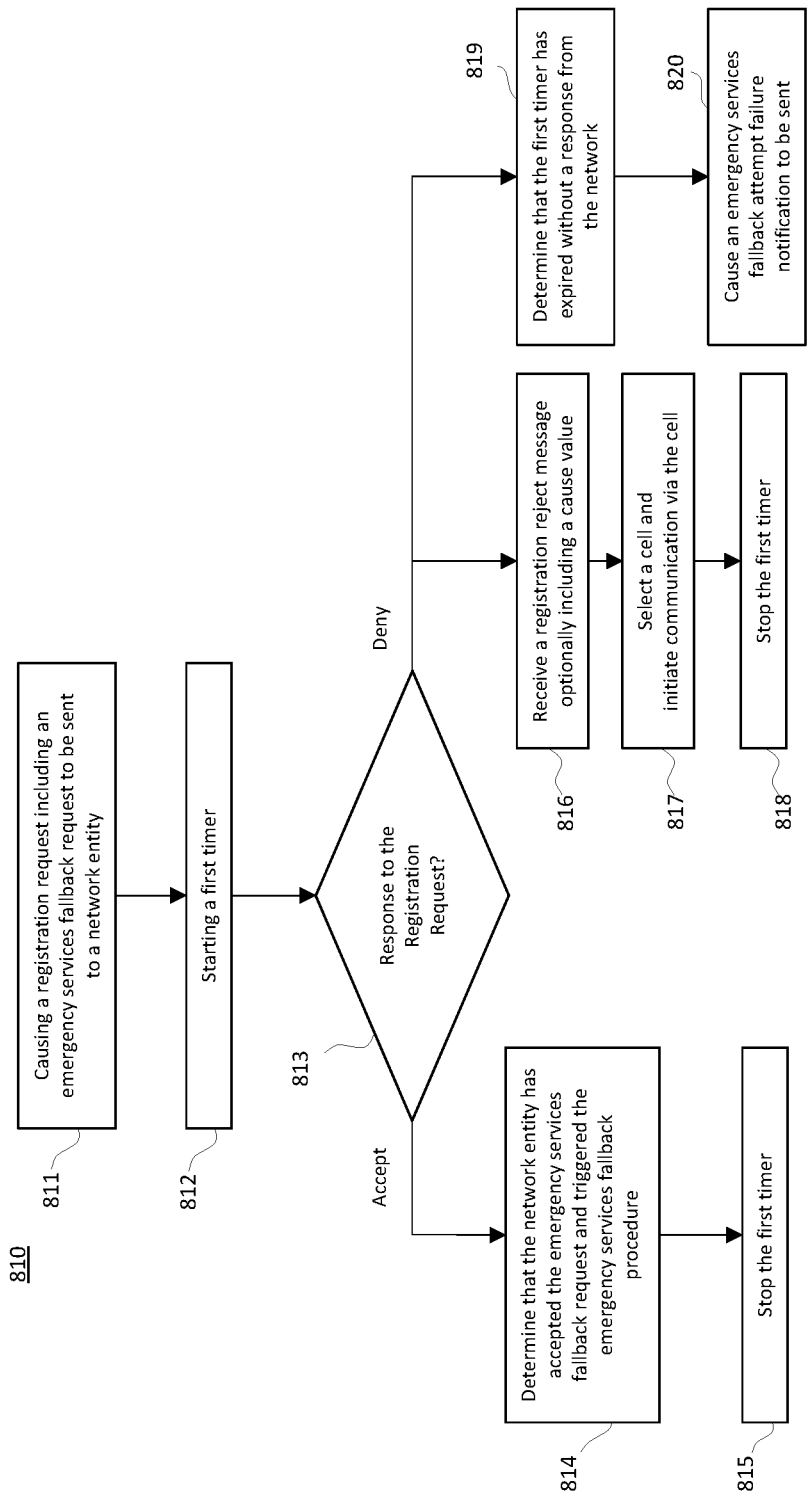
Figure 9:
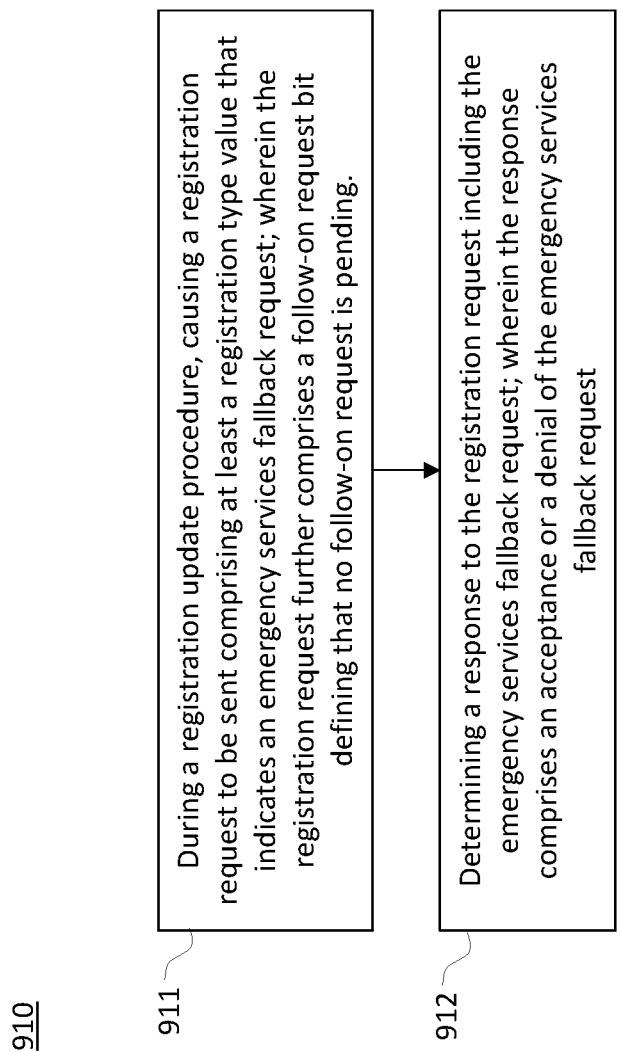
Figure 10:
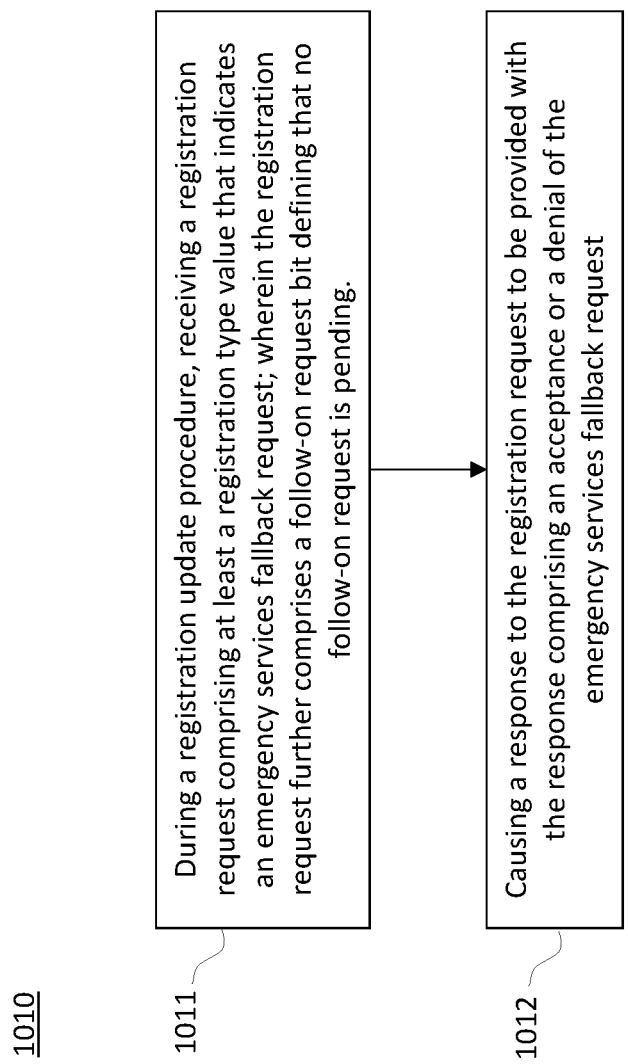

FIG. 8 is a flow chart illustrating the operations performed, such as by a communication device or other client device, in accordance with an example embodiment;

FIG. 9 is a flow chart illustrating the operations performed, such as by a communication device or other client device, in accordance with an example embodiment; and FIG. 10 is a flow chart illustrating the operations performed, such as by a network device, such as an AMF, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "go-between," and similar terms can be used interchangeably to refer to computers connected via, or programs running on, a network or plurality of networks capable of data creation, modification, deletion, transmission, receipt, and/or storage in accordance with embodiments of the present invention. Thus, use of any such terms should not be taken to limit the spirit and scope of embodiments of the present invention.

Additionally, as used herein, the terms "user equipment," "user device," "device," "apparatus," "mobile device," "personal computer," "laptop computer," "laptop," "desktop computer," "desktop," "mobile phone," "tablet," "smartphone," "smart device," "cellphone," "communication device," "user communication device," "terminal," and similar terms can be used interchangeably to refer to computers configured to access a network or plurality of networks for at least the purpose of wired or wireless transmission of communication signals in accordance with example embodiments. Thus, use of any such terms should not be taken to limit the spirit and scope of the disclosed embodiments.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

In the following, certain embodiments are explained with reference to communication devices capable of communication via a wired and/or wireless network and communication systems serving such communication devices. Before explaining in detail the exemplifying embodiments, certain general principles of a wired and/or wireless communication system, access systems thereof, and communication devices are briefly explained with reference to FIGS. 1-3 to assist in understanding the technology underlying the described examples.

According to some embodiments, a communication device or terminal can be provided for wireless access via cells, base stations, access points or the like (e.g., wireless transmitter and/or receiver nodes providing access points for a radio access communication system and/or other forms of wired and/or wireless networks). Such wired and/or wireless networks include, but are not limited to, networks configured to conform to 2G, 3G, 4G, LTE, 5G, and any other similar or yet to be developed future communication network standards. The present disclosure contemplates that any methods, apparatuses, computer program codes, and any portions or combination thereof can also be implemented with yet undeveloped communication networks and associated standards as would be developed in the future and understood by one skilled in the art in light of the present disclosure.

Access points and hence communications there through are typically controlled by at least one appropriate control apparatus so as to enable operation thereof and management of mobile communication devices in communication therewith. In some embodiments, a control apparatus for a node can be integrated with, coupled to, and/or otherwise provided for controlling the access points. In some embodiments, the control apparatus can be arranged to allow communications between a user equipment and a core network or a network entity of the core network. For this purpose, the control apparatus can comprise at least one memory, at least one data processing unit such as a processor or the like, and an input/output interface. Via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions can be distributed between several control units. In some embodiments, each base station can comprise a control apparatus. In alternative embodiments, two or more base stations can share a control apparatus.

Access points and associated controllers can communicate with each other via a fixed line connection and/or via a radio interface. The logical connection between the base station nodes can be provided for example by an X2, an S1, and/or the like interface. This interface can be used for example for coordination of operation of the stations and performing reselection or handover operations. The logical communication connection between the initial communication node and the final communication node on the network can comprise a plurality of intermediary nodes. Additionally, any of the nodes can be added to and removed from the logical communication connection as required to establish and maintain a network function communication.

The communication device or user equipment can comprise any suitable device capable of at least receiving a communication signal comprising data. The communication signal can be transmitted via a wired connection, a wireless connection, or some combination thereof. For example, the device can be a handheld data processing device equipped with a radio receiver, a data processor and a user interface. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, earpieces with wireless connectivity, jewelry and so on, universal serial bus (USB) sticks with wireless capabilities, modem data cards, machine type devices or any combinations of these or the like.

In some embodiments, a communication device, e.g., configured for communication with the wireless network or a core network entity, can be exemplified by a handheld or otherwise mobile communication device (or user equipment UE). A mobile communication device can be provided with wireless communication capabilities and appropriate electronic control apparatus for enabling operation thereof. Thus, the communication device can be provided with at least one data processing entity, for example a central processing unit and/or a core processor, at least one memory and other possible components such as additional processors and memories for use in software and hardware aided execution of tasks it is designed to perform. The data processing, storage and other relevant control apparatus can be provided on an appropriate circuit board and/or in chipsets. Data processing and memory functions provided by the control apparatus of the communication device are configured to cause control and signaling operations in accordance with certain embodiments as described later in this description. A user can control the operation of the communication device by a suitable user interface such as a touch sensitive display screen or pad and/or a keypad, one of more actuator buttons, voice commands, combinations of these, or the like. A speaker and a microphone are also typically provided. Furthermore, a mobile communication device can comprise appropriate connectors (either wired or wireless) to other devices and/or for connecting external accessories, for example hands-free equipment, thereto.

In some embodiments, a communication device can communicate wirelessly via an appropriate apparatus for receiving and transmitting signals. In some embodiments, a radio unit can be connected to the control apparatus of the device. The radio unit can comprise a radio part and associated antenna arrangement. The antenna arrangement can be arranged internally or externally to the communication device.

FIGS. 1-3 illustrate various example architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide an air interface (e.g., New Radio (NR)) for communication or connection between a User Equipment 102 (UE 102) and a Data Network 116 (DN 116) via a Core Network 101 (CN 101) of the communications network 100. The UE 102 can be associated with one or more devices associated with one or more NF service consumers. As illustrated in FIG. 1, a communications network 100 can be provided in which the UE 102 is in operable communication with the Radio Access Network 104 (RAN 104), such as by way of a transmission tower, a base station, an access point, a network node, and/or the like. In some embodiments, the RAN 104 can communicate with the CN 101 or a component or entity thereof. In some embodiments, the CN 101 can facilitate communication between the UE 102 and the DN 116, such as for sending data, messages, requests, and/or the like. In some embodiments, the DN 116 or the CN 101 can be in communication with an Application Server (AS) or Application Function (AF) 112 (AS 112 or AF 112). The RAN 104, CN 101, DN 116, and/or AS/AF 112 can be associated with a Network Repository Function (NRF), Network Function (NF) service producer, Secure Copy Protocol (SCP), Security Edge Protection Proxy (SEPP), Policy Charging Function (PCF), the like, or any combination thereof.

In the context of a 5G network, such as illustrated in FIGS. 2 and 3, the communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the RAN 104, which can then relay the communications between the UE 102 and the CN 101, the CN 101 being connected to the DN 116, which can be in communication with one or more AS/AF 112. In some embodiments, the UE 102 can be in communication with a RAN 104, which can act as a relay between the UE 102 and other components or services of the CN 101. For instance, in some embodiments, the UE 102 can communicate with the RAN 104, which can in turn communicate with an Access and Mobility Management Function 108 (AMF 108). In other instance or embodiments, the UE 102 can communicate directly with the AMF 108. In some embodiments, the AMF 108 can be in communication with one or more network functions (NFs), such as an Authentication Server Function 120 (AUSF 120), a Network Slice Selection Function 122 (NSSF 122), a Network Repository Function 124 (NRF 124), a Policy Charging Function 114 (PCF 114), a Network Data Analytics Function 126 (NWDAF 126), a Unified Data Management function 118 (UDM 118), the AS/AF 112, a Session Management Function 110 (SMF 110), and/or the like.

In some embodiments, the SMF 110 can be in communication with one or more User Plane Functions 106 (UPF 106, UPF 106a, UPF 106b, collectively "UPF 106"). By way of example only, in some embodiments, the UPF 106 can be in communication with the RAN 104 and the DN 116. In other embodiments, the DN 116 can be in communication with a first UPF 106a and the RAN 104 can be in communication with a second UPF 106b, while the SMF 110 is in communication with both the first and second UPFs 106a, b and the first and second UPFs 106a, b are in communication each with the other.

In some embodiments, the UE 102 can comprise a single-mode or a dual-mode device such that the UE 102 can be connected to one or more RANs 104. In some embodiments, the RAN 104 can be configured to implement one or more Radio Access Technologies (RATs), such as Bluetooth, Wi-Fi, and Global System for Mobile Communications (GSM), Universal Mobile Telecommunications Service (UMTS), LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some embodiments, the communications network 100 can comprise or employ massive Multiple Input and Multiple Output (massive MIMO) antennas. In some embodiments, the communications network 100 can comprise multi-user MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, devices, or techniques, such as small cell, low-powered RAN, beamforming of radio waves, WIFI-cellular convergence, Non-Orthogonal Multiple Access (NOMA), channel coding, and the like.

As illustrated in FIG. 3, the UE 102 can be configured to communicate with the RAN 104 in a N1 interface, e.g., according to a non-access stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in an Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which can act as a bridge between the control plane and the user plane, such as acting as a conduit for a Protocol Data Unit (PDU) session during which information is transmitted between, e.g., the UE 102 and the CN 101 or components/services thereof.

It will be appreciated that certain example embodiments described herein arise in the context of a telecommunications network, including but not limited to a telecommunications network that conforms to and/or otherwise incorporates aspects of a $5^{th}$ generation (5G) architecture. While FIGS. 1-3 illustrate various configurations and/or components of an example architecture of the communications network 100, many other systems, system configurations, networks, network entities, and pathways/protocols for communication therein are contemplated and considered within the scope of this present disclosure.

While the methods, devices/apparatuses, and computer program products/codes described herein are described within the context of a $5^{th}$ generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the present disclosure.

Turning now to FIG. 4, examples of an apparatus that may be embodied by the user equipment or by a network entity, such as a server or other computing device, e.g., AMF, are depicted in accordance with an example embodiment of the present disclosure. As described below in conjunction with the flowcharts, block diagrams, or the like of FIGS. 5, 6, 7a, 7b, 8, 9, and 10, the apparatus 200 of an example embodiment can be configured to perform the functions described herein. In any instance, the apparatus 200 can more generally be embodied by a computing device, such as a server, a personal computer, a computer workstation or other type of computing device including those functioning as a user equipment and/or a component of a wireless network or a wireless local area network, e.g., an AMF. Regardless of the manner in which the apparatus 200 is embodied, the apparatus of an example embodiment can be configured as shown in FIG. 4 so as to include, be associated with or otherwise be in communication with a processor 202 and a memory device 204 and, in some embodiments, and/or a communication interface 206. Although not illustrated, the apparatus of an example embodiment may also optionally include a user interface, such as a touch screen, a display, a keypad or the like.

The processor 202 (and/or co-processors or any other circuitry assisting or otherwise associated with the processor) can be in communication with the memory device 204 via a bus for passing information among components of the apparatus 200. The memory device can include, for example, one or more volatile and/or non-volatile memories, such as a non-transitory memory device. In other words, for example, the memory device can be an electronic storage device (e.g., a computer readable storage medium) comprising gates configured to store data (e.g., bits) that can be retrievable by a machine (e.g., a computing device like the processor). The memory device can be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor.

The apparatus 200 can, in some embodiments, be embodied in various computing devices as described above. However, in some embodiments, the apparatus can be embodied as a chip or chip set. In other words, the apparatus can comprise one or more physical packages (e.g., chips) including materials, components and/or wires on a structural assembly (e.g., a baseboard). The structural assembly can provide physical strength, conservation of size, and/or limitation of electrical interaction for component circuitry included thereon. The apparatus can therefore, in some cases, be configured to implement an embodiment on a single chip or as a single "system on a chip." As such, in some cases, a chip or chipset can constitute means for performing one or more operations for providing the functionalities described herein.

The processor 202 can be embodied in a number of different ways. For example, the processor can be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor can include one or more processing cores configured to perform independently. A multi-core processor can enable multiprocessing within a single physical package. Additionally or alternatively, the processor can include one or more processors configured in tandem via the bus to enable independent execution of instructions, pipelining and/or multithreading.

In an example embodiment, the processor 202 can be configured to execute instructions stored in the memory device 204 or otherwise accessible to the processor. Alternatively or additionally, the processor can be configured to execute hard coded functionality. As such, whether configured by hardware or software methods, or by a combination thereof, the processor can represent an entity (e.g., physically embodied in circuitry) capable of performing operations according to an embodiment of the present disclosure while configured accordingly. Thus, for example, when the processor is embodied as ASIC, FPGA or the like, the processor can be specifically configured hardware for conducting the operations described herein. Alternatively, as another example, when the processor is embodied as an executor of instructions, the instructions can specifically configure the processor to perform the algorithms and/or operations described herein when the instructions are executed. However, in some cases, the processor can be a processor of a specific device (e.g., an encoder and/or a decoder) configured to employ an embodiment of the present disclosure by further configuration of the processor by instructions for performing the algorithms and/or operations described herein. The processor can include, among other things, a clock, an arithmetic logic unit (ALU) and logic gates configured to support operation of the processor.

In embodiments that include a communication interface 206, the communication interface can be any means such as a device or circuitry embodied in either hardware or a combination of hardware and software that is configured to receive and/or transmit data from/to a network and/or any other device or module in communication with the apparatus 200, such as an NF, NRF, a base station, an access point, SCP, UE 102, radio access network, core network services, an application server/function, a database or other storage device, etc. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication. As such, for example, the communication interface can include a communication modem and/or other hardware/software for supporting communication via cable, Digital Subscriber Line (DSL), Universal Serial Bus (USB) or other mechanisms. In some embodiments, a session management function can comprise a 5GC session management function for any suitable Control and User Plane Separation (CUPS) architecture, such as for the Gateway General Packet Radio Service Support Node (GGSN-C), Trusted Wireless Access Gateway (TWAG-C), Broadband Network Gateway Control and User Plane Separation (BNG-CUPS), N4-interface, Sxa-interface, Sxb-interface, Sxc-interface, Evolved Packet Core (EPC) Secure Web Gateway Control Plane Function (SWG-C), EPC Packet Data Network Gateway Control Plane Function (PGW-C), EPC Traffic Detection Function for Control Plane (TDF-C), and/or the like.

As illustrated, the apparatus 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the apparatus 200, at least in part. In some embodiments, the processor 202 can be configured to control the functioning of the transmitter and receiver by effecting control signaling via electrical leads to the transmitter and receiver. Likewise, the processor 202 can be configured to control other elements of apparatus 200 by effecting control signaling via electrical leads connecting the processor 202 to the other elements, such as a display or the memory 204.

The apparatus 200 can be capable of operating with one or more air interface standards, communication protocols, modulation types, access types, and/or the like. Signals sent and received by the processor 202 can include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, Asymmetric Digital Subscriber Line (ADSL), Data Over Cable Service Interface Specification (DOCSIS), and/or the like. In addition, these signals can include speech data, user generated data, user requested data, and/or the like.

For example, the apparatus 200 and/or a cellular modem therein can be capable of operating in accordance with various $1^{st}$ generation (1G) communication protocols, $2^{nd}$ generation (2G or 2.5G) communication protocols, $3^{rd}$ generation (3G) communication protocols, $4^{th}$ generation (4G) communication protocols, $5^{th}$ generation (5G) communication protocols, Internet Protocol Multimedia Subsystem (IMS) communication protocols (for example, Session Initiation Protocol (SIP) and/or the like. For example, the apparatus 200 can be capable of operating in accordance with 2G wireless communication protocols Interim Standard 136 (IS-136), Time Division Multiple Access (TDMA), Global System for Mobile Communications (GSM), Interim Standard 95 (IS-95), Code Division Multiple Access (CDMA), and/or the like. In addition, for example, the apparatus 200 can be capable of operating in accordance with 2.5G wireless communication protocols General Packet Radio Service (GPRS), Enhanced Data GSM Environment (EDGE), and/or the like. Further, for example, the apparatus 200 can be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The NA 200 can be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 200 can be capable of operating in accordance with 4G wireless communication protocols, such as LTE Advanced, 5G, and/or the like as well as similar wireless communication protocols that can be subsequently developed. In some embodiments, the apparatus 200 can be capable of operating according to or within the framework of any suitable CUPS architecture, such as for the gateway GPRS support node (GGSN-C), trusted wireless access gateway (TWAG-C), broadband network gateways (BNGs), N4-interface, Sxa-interface, Sxb-interface, Sxc-interface, evolved packet core (EPC) SWG-C, EPC PGW-C, EPC TDF-C, and/or the like. Indeed, although described herein in conjunction with operation with a 5G system, the apparatus and method may be configured to operate in conjunction with a number of other types of systems including systems hereinafter developed and implemented.

Some of the embodiments disclosed herein can be implemented in software, hardware, application logic, or a combination of software, hardware, and application logic. The software, application logic, and/or hardware can reside on memory 204, the processor 202, or electronic components, for example. In some example embodiments, the application logic, software or an instruction set is maintained on any one of various conventional computer-readable media. In the context of this document, a "computer-readable medium" can be any non-transitory media that can contain, store, communicate, propagate or transport the instructions for use by or in connection with an instruction execution system, apparatus, or device, such as a computer or data processor circuitry, with examples depicted at FIG. 4, computer-readable medium can comprise a non-transitory computer-readable storage medium that can be any media that can contain or store the instructions for use by or in connection with an instruction execution system, apparatus, or device, such as a computer.

FIG. 5 illustrates a signal flow diagram between UE 102 and a plurality of network entities and/or functions (e.g., AMF 108, etc.) in order to request emergency services fallback in accordance with an example embodiment. Emergency services are provided to support emergency sessions and refers to functionalities (e.g., voice calling, texting, etc.) provided by the serving network. Emergency services are provided to a normal registered UE on the serving network. Additionally, based on local laws and regulations the emergency services may be provided to an unregistered UE that is in a limited service state on the serving network. Receiving emergency services in a limited service state does not require a valid subscription and the network may allow or reject (depending on applicable laws, regulations, and operator policy) an emergency registration request for UE that has been identified to be in a limited service state.

In order to support various deployment scenarios for obtaining emergency services, the UE and serving network may support the emergency services fallback mechanism. The emergency services fallback mechanism directs or redirects the UE to local network access node(s) which support emergency services when emergency services are not supported by the current network access configuration of the UE. Emergency services fallback procedures may be used when the network does not indicate support for emergency services but does indicate support for emergency services fallback.

As 511 illustrates UE 102 is configured to choose or "camp" in a cell of a cellular system, such as a 5G system (5GS). This choosing of a cell with which to connect is known as "camping on the cell". In this example embodiment, the UE has registered its presence in the registration area of the chosen cell, such as by a location registration procedure. Once registered, the UE will update its registration for various reasons, such as based upon the mobility of the UE which results in a change of location or on a periodic basis. As shown at 512 of FIG. 5, the UE has transmitted a registration update request, such as to the AMF. Although not shown, the AMF may accept the registration update request. However, in instances in which (i) the registration update request has not been accepted, such as in instances in the registration update request has failed due to a lack of response from the network, that is, the AMF, or other predefined circumstances, such as the circumstances described in subclauses 5.3.9 and 5.5.1.3.5 of 3GPP TS 24.501, and in which (ii) the UE determines that an emergency session needs to be established, such as based on input from the user of the UE 102 or from upper layers of the UE as shown in 513, the method and apparatus 200 of an example embodiment still provides for the request for and, in at least some instances, the initiation of emergency services fallback procedure.

In such an instance, a registration request is sent from the UE 102, by way of RAN 104, to the AMF 108, as 514 illustrates. The registration request includes an indication of the emergency services fallback type that is requested and, in some embodiments, a follow-on request bit indicating whether or not a follow-on request is pending. In an example embodiment, the follow-on request bit includes a "0" bit corresponding to the message "No follow-on request pending" and a "1" bit corresponding to the message "Follow-on request pending". If accepted by the AMF, AMF 108 will send a request for the emergency services fallback type to the RAN 104 in order to authorize the RAN to support and conduct the emergency session on behalf of the UE 102, as 515 illustrates. In an instance in which the request for an emergency session is accepted, the process 510 of the illustrated embodiment may continue to provide the emergency session with the operations defined by blocks 516a, 516b, 517, the like, or some combination thereof. In an embodiment in which the UE 102 determines that a handover procedure is required, such as to support the emergency session, the UE 102 can initiate the handover procedure is accordance with an Inter-Radio Access Technology (RAT) handover or a Radio Resource Control (RRC) redirection to a 5GC-connected E-UTRA handover, see block 516a. The handover procedure is determined in this example embodiment based on measurements (e.g., distance, signal strength, etc.) taken by the UE 102 in reference to network access nodes (e.g., RAN, cell, etc.). For example, in one embodiment in which the UE 102 determines that a currently connected network access node is losing signal strength, the UE 102 can initiate the handover procedure to switch to another network access node of comparatively better or improving signal strength. Additionally or alternatively, in some embodiments, the UE 102 can initiate handover procedures for Inter-system handover or RRC redirection to EPS, see block 516b. In some embodiments, the signal flow 510 can proceed directly from the issuance of an emergency services fallback request to the RAN 104 at block 515 to the IMS procedure for establishment of IMS Emergency Session (e.g., voice, text-messaging, file transfer, real-time video, etc.) as shown in block 517 without the need for any handover procedures, such as depicted by blocks 516a and 516b. In other embodiments, the signal flow 510 requires a handover procedure as described by blocks 516a and 516b before proceeding to establishing the emergency session in block 517. Additionally, any of the handover procedures described can occur a plurality of times in a plurality of combinations and should not be limited to only the examples described with respect to blocks 516a and 516b.

However, in an instance in which the request for an emergency session that is included within the registration request is rejected, such as via a registration reject message from the AMF 108, the UE 102 of an example embodiment may attempt to reconnect via another cell in a current or another tracking area, such as a current or another tracking area which supports EPC or 5GCN, and to further initiate, for example, at least a 5GMM, EMM, or other mobility management procedure. Alternatively, in an instance in which the registration request that was sent due to a request from its upper layers to perform emergency services fallback is not acted upon and no response is received, at least not within a predefined period of time, the UE 102 may consider the registration response to have failed and may inform its upper layers and/or the user, e.g., send an indication that the emergency services fallback attempt failed to the upper layers.

FIG. 6 illustrates another illustration of three alternative signal flows 610 between UE 102 and a network entity, such as the AMF 108, in accordance with an example embodiment. In some embodiments, the communications between UE 102 and AMF 108 are established directly between the UE 102 and AMF 108 using an N1 interface. In other embodiments, the communications between UE 102 and AMF 108 are established indirectly between the UE 102 and AMF 108 using an N2 interface via a RAN 104 or another intermediate network entity.

Prior to the signal flows depicted in FIG. 6, the UE 102 has registered with the AMF 108 and is in the process of updating its registration, such as mobility registration updating or periodic registration updating. In the instances depicted in FIG. 6, the registration update request has not been accepted by the AMF, such as in instances in the registration update request has failed due to a lack of response from the network or due to predefined circumstances, such as the circumstances described in subclauses 5.3.9 and 5.5.1.3.5 of 3GPP TS 24.501, but the UE determines that an emergency session needs to be established, such as based on input from the user of the UE 102 or from upper layers of the UE.

In such an instance, the UE 102 of an example embodiment starts running a first timer, such as a T3510 timer, as shown in block 611a upon sending a registration request for emergency services fallback to AMF 108 as shown at 612a. Upon receipt of the registration request for emergency services fallback, the AMF 108 of this example embodiment will determine if a temporary identity is allocated and, if the temporary identity is allocated, the AMF 108 starts running a second timer, such as a T3550 timer, as shown in block 613a upon sending a registration accepted response to the UE 102 as shown at 614a. Upon receipt of the registration accepted response the UE 102 of this example embodiment stops running the first timer as shown at 615a and optionally determines if the temporary identity is allocated at block 616a and, if the temporary identity is allocated, sends a registration complete notification to the AMF 108 as shown at 617a. Upon receipt of the registration complete notification AMF 108 stops running the second timer, as shown at 618a. However, in an instance in which the UE 102 does not send the registration complete notification to the AMF 108, then the running second timer, such as the T3550 timer, will expire after a predefined time. On the first expiry of the second timer, the AMF 108 may retransmit the registration accept response to the UE 102, as shown at 614a, and shall reset and restart the second timer. Upon subsequent instances of the expiry of the second timer, the AMF 108 may follow the procedures as described in subclause 5.5.1.2.8.c of 3GPP TS 24.501, including a plurality of additional transmittals of the registration accepted response to the UE 102. In an instance that the prescribed number of additional transmittals of the registration accepted response to the UE 102 are exhausted, e.g., 4 to 5 additional transmittals, then the AMF 108 may enter a state of 5GMM deregistration.

In another example signal flow sequence 610, the UE 102 starts running a first timer, such as a T3510 timer, as shown in block 611b upon sending a registration request for emergency services fallback to AMF 108 as shown at 612b. Upon receipt of the registration request for emergency services fallback the AMF 108 of this example embodiment determines that the registration is accepted at block 613b and sends an access stratum (AS) indication response to the UE 102 as shown at 614b. Upon receipt of the access stratum (AS) indication response in accordance with this example embodiment, the UE 102 will stop running the first timer as shown at 615b.

In another example signal flow sequence 610, the UE 102 starts running a first timer, such as a T3510 timer, as shown in block 611c upon sending a registration request for emergency services fallback to AMF 108 as shown at 612c. Upon receipt of the registration request for emergency services fallback, the AMF 108 of this example embodiment determines that the registration is rejected and sends a registration rejected response to the UE 102 as shown in blocks 613c and 614c, respectively. Upon receipt of the registration rejected response the UE 102 will stop running the first timer as shown in block 615c.

FIG. 7a illustrates a configuration of an example registration type information element (IE) 700a, according to some embodiments. In this embodiment, bits 1 to 8 are depicted in top row 701 and correspond to the octet information labeled in bottom row 702. The 5GS registration type information representing the "emergency services fallback" IE type value correspond to bits 1 to 3 of IE 700a. In this embodiment, the follow-on request bit (FOR) corresponds to bit 4 of IE 700a.

FIG. 7b illustrates a configuration of an example registration type values table 700b depicting the "emergency services fallback" IE type value that may be employed in conjunction with the registration type IE of FIG. 7a, according to some embodiments. In this example embodiment, the emergency services fallback IE type value included in the registration request as a request for emergency services fallback is defined by bit sequence 1-0-1, which corresponds to bits 1 to 3 of the registration type IE 700a, to distinguish the registration request for emergency services fallback from other types of registration, such as initial registration, mobility registration updating, periodic registration updating or emergency registration. In this embodiment, the follow-on request bit (FOR) corresponding to bit 4 of registration type IE 700a is set to 0 for no follow-on request pending to distinguish the registration request from one that has a follow-on request pending as indicated by a FOR bit value of 1. In some embodiments, unified access control is required and the UE 102 assigns Access Category 2 (=emergency) to the access attempt caused by the registration request sent from the UE 102 to the AMF 108 for emergency services fallback. In some embodiments, the UE 102 NAS layer does not provide the UE AS layer with any Single Network Slice Selection Assistance Information (S-NSSAI) if the registration request message is sent for emergency services fallback.

FIG. 8 illustrates a flowchart of the operations of an example method 810 performed by an example apparatus 200 which, in one embodiment, may be embodied by a computer program product comprising computer program code executed by processor 202 of a UE 102. As shown in block 811, apparatus 200 of this example embodiment incudes means, such as the processor 202, the memory 204, the communication interface 206 or the like, for causing a registration request including an emergency services fallback request to be sent to a network entity, such as an AMF as referenced by way of example, but not of limitation, throughout the discussion of FIG. 8. In this example embodiment, the registration request including the emergency services fallback request is transmitted during a registration update procedure. In this regard, prior to the operations depicted in FIG. 8, the UE 102 has registered with the network, such as the AMF 108, and is in the process of updating its registration, such as mobility registration updating or periodic registration updating. However, the registration update request has not been accepted by the AMF, such as in instances in the registration update request has failed due to a lack of response from the network or due to predefined circumstances, such as the circumstances described in subclauses 5.3.9 and 5.5.1.3.5 of 3GPP TS 24.501. While in this state, the UE determines that an emergency session needs to be established, such as based on input from the user of the UE 102 or from upper layers of the UE, and the registration request including the emergency services fallback request is generated and transmitted, such as by the processor 202 and/or the communication interface 206. The registration request of this example embodiment may include the emergency services fallback request in the form of a registration type value, such as a 5G system (5GS) registration type value, and a follow-on request bit as described above. Concurrent with the transmission of the registration request including the emergency services fallback request, the apparatus 200 of an example embodiment includes means, such as the processor 202 or the like, for starting a first timer, such as a T3150 timer. See block 812.

As shown in block 813, apparatus 200 also includes means, such as processor 202 or the like, for determining the response to the registration request including the emergency services fallback request, such as the from the AMF 108. Although it may be determined in various manners that the response to the emergency services fallback request is an acceptance of the emergency services fallback request, as shown in block 814, the apparatus 200 of one example embodiment includes means, such as the processor 202 or the like, for determining that the network entity, such as the AMF, has accepted the emergency services fallback request and triggered the emergency services fallback procedure, such as specified in subclause 4.13.4.2 of 3GPP TS 23.502, in an instance in which an indication is provided, such as via the lower layers, that the mode of the UE has changed, such as to the S1 mode, and/or that a network connection has been established, such as in an instance in which E-UTRA has connected to 5GCN. In determining the response to the registration request, the AMF can skip the check for restrictions (e.g., regional subscription restrictions, access restrictions, closed access group restrictions) if the registration request includes a registration type value that indicates an emergency services fallback or emergency registration. If a UE operating in single-registration mode has changed to S1 mode, the UE, such as the processor, may disable the N1 mode capability for 3GPP access. In an instance in which the apparatus 200, such as the processor 202, determines that the emergency services fallback request has been accepted, the apparatus includes means, such as the processor or the like, for stopping the first timer. See block 815.

In an instance in which the registration request including the emergency services fallback request is not accepted, the apparatus 200, such as the processor 202, may make this determination in various manners. In one instance, as shown in block 816, apparatus 200 also includes means, such as processor 202, the communication interface 206 or the like, for receiving a rejected response, such as a registration reject message, from the network, such as the AMF 108. In some embodiments, the response to the registration request including the emergency services fallback request, such as the registration reject message, may identify a cause of the rejection, such as by provided a cause value. In instances in which the cause value has a predefined value, the apparatus 200 of one example embodiment also includes means, such as the processor 202, the communication interface 206 or the like, for selecting a cell connected to an evolved packet core (EPC) or a 5G core network (5GCN) and initiating communication via the cell, thereby potentially providing for emergency services, albeit in a different manner than originally requested. See block 817. In instance in which the apparatus 200, such as the processor 202, the communication interface 206, or the like, receives a rejected response to the registration request including the emergency services fallback request, the apparatus includes means, such as the processor or the like, for stopping the first timer. See block 818.

For example, in response to a predefined cause value, e.g., #9, indicating that the identity of the UE 102 cannot be derived by the network, the apparatus 200 embodied by the UE, such as the processor 202, the communication interface 206 or the like, may be configured to attempt to select an E-UTRA cell connected to EPC or 5GCN according to the domain priority and selection rules specified in 3GPP TS 23.167. If the UE finds a suitable E-UTRA cell, the UE then proceeds with the appropriate EMM or 5GMM procedures. As another example, in response to a predefined cause value, e.g., #15, indicating that there are no suitable cells in the tracking area, the apparatus embodied by the UE, such as the processor, the communication interface or the like, may attempt to select an E-UTRA cell connected to EPC or 5GC according to the emergency services support indicator (see 3GPP TS 36.331). If the UE finds a suitable E-UTRA cell, the UE then proceeds with the appropriate EMM or 5GMM procedures. Otherwise, the UE may search for a suitable cell in another tracking area according to 3GPP TS 38.304.

In another instance in which the registration request including the emergency services fallback request is not accepted, the apparatus 200 includes means, such as the processor 202 or the like, for determining that the first timer has expired without a response from the network, such as the AMF 108. See block 819. In this situation, the apparatus 200 of an example embodiment includes means, such as the processor 202 or the like, for causing a notification of the expiration of the timer without the establishment of emergency services to be provided, such as by causing an emergency services fallback attempt failure notification to be sent to a client, e.g., the upper layers, the user, etc. See block 820.

FIG. 9 illustrates another flowchart of the operations of an example method 910 performed by an example apparatus 200 which, in one embodiment, may be embodied by a computer program product comprising computer program code executed by processor 202 of a UE 102. As shown in block 911, apparatus 200 of this example embodiment includes means, such as the processor 202, the memory 204, the communication interface 206 or the like, for causing, during a registration update procedure, a registration request to be sent comprising an emergency services fallback request, such as defined by a registration type value that indicates an emergency services fallback request and, in some embodiments, a follow-on request bit defining whether or not a follow-on request is pending. As described above, prior to the operations depicted in FIG. 9, the UE 102 has registered with the network, such as the AMF 108, and is in the process of updating its registration, such as mobility registration updating or periodic registration updating. However, the registration update request has not been accepted by the AMF, such as in instances in the registration update request has failed due to a lack of response from the network or due to predefined circumstances, such as the circumstances described in subclauses 5.3.9 and 5.5.1.3.5 of 3GPP TS 24.501. While in this state, the UE determines that an emergency session needs to be established, such as based on input from the user of the UE 102 or from upper layers of the UE, and the registration request including the emergency services fallback request is generated and transmitted, such as by the processor 202 and/or the communication interface 206. As shown in block 911, apparatus 200 of this example embodiment incudes means, such as the processor 202, the memory 204, the communication interface 206 or the like, for determining a response to the registration request including the emergency services fallback request. The response comprises an acceptance or a denial of the emergency services fallback request, such as described by the examples provided above.

FIG. 10 illustrates a flowchart of the operations of an example method 1010 performed by an example apparatus 200 which, in one embodiment, may be embodied by a computer program product comprising computer program code executed by processor 202 of a network entity, such as an AMF 108. As shown in block 1011, apparatus 200 of this example embodiment incudes means, such as the processor 202, the memory 204, the communication interface 206 or the like, for receiving, during a registration update procedure, a registration request comprising an emergency services fallback request, such as defined by a registration type value that indicates an emergency services fallback request and, in some embodiments, a follow-on request bit defining whether or not a follow-on request is pending. In this regard, prior to the operations depicted in FIG. 10, the UE 102 has registered with the network, such as the AMF 108, and is in the process of updating its registration, such as mobility registration updating or periodic registration updating. However, the network entity, such as the AMF, has not yet accepted the registration update request, such as in instances in the network entity, such as the AMF, has not provided a response or due to other predefined circumstances, such as the circumstances described in subclauses 5.3.9 and 5.5.1.3.5 of 3GPP TS 24.501. While in this state, the UE has determined that an emergency session needs to be established, such as based on input from the user of the UE 102 or from upper layers of the UE, and the registration request including the emergency services fallback request has been generated and transmitted and then received by the network entity, such as the AMF. As shown in block 1012, apparatus 200 of this example embodiment incudes means, such as the processor 202, the memory 204, the communication interface 206 or the like, for causing a response to be provided to the registration request including the emergency services fallback request. The response may constitute an acceptance or a denial of the emergency services fallback request.

In one instance, the response indicating an acceptance of the emergency services fallback request is not provided explicitly to the UE 102, but may be determined by the UE based on other changes caused by the AMF 108 with those changes serving as the response in the form of an acceptance in this instance. For example, the apparatus 200, such as the AMF 108, may indicate that the emergency services fallback request has been accepted and trigger the emergency services fallback procedure, such as specified in subclause 4.13.4.2 of 3GPP TS 23.502, by causing the mode of the UE to change, such as to the S1 mode, and/or causing a network connection to been established with the UE, such as in an instance in which E-UTRA has connected to 5GCN. Alternatively, in an instance in which the registration request including the emergency services fallback request is not accepted, the apparatus 200, such as the processor 202, may cause a rejected response, such as a registration reject message, to be transmitted to the UE 102. In some embodiments, the response to the registration request including the emergency services fallback request, such as the registration reject message, may identify a cause of the rejection, such as by a cause value. In instances in which the cause value has a predefined value, the UE may be caused to select a cell, such as a cell connected to an evolved packet core (EPC) or a 5G core network (5GCN), and initiate communication via the cell, thereby potentially providing for emergency services, albeit in a different manner than originally requested.

For example, the apparatus 200 embodied by the network entity, e.g., the AMF 108, such as the processor 202, may be configured to cause a registration reject message to include a predefined cause value, e.g., #9, indicating that the identity of the UE cannot be derived by the network. As another example, the apparatus 200 embodied by the network entity, e.g., the AMF 108, such as the processor 202, may be configured to cause a registration reject message to include a predefined cause value, e.g., #15, indicating that there are no suitable cells in the tracking area.

In another instance in which the registration request including the emergency services fallback request is not accepted, the apparatus 200, such as the processor 202, may not provide a response, at least not during the predefined period of time measured by the first timer, thereby resulting in the expiration of the first timer and the provision of an indication that the emergency services fallback request was not accepted.

As described above, a method, apparatus 200 and computer program product are disclosed to enhance the emergency services fallback procedure. The emergency services fallback procedure is initiated during the registration update procedure without the UE having to first complete the registration update procedure prior to separately initiating and completing the emergency services fallback procedure. As a result, access to the emergency services fallback procedure may be advantageously expedited, such as in instances in which the registration update procedure, e.g., a periodic registration updates has failed.

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory device, e.g., 204, of an apparatus, e.g., 200, employing an embodiment of the present invention and executed by processor, e.g., 202, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations, methods, steps, processes, or the like, above can be modified or further amplified. Furthermore, in some embodiments, additional optional operations, methods, steps, processes, or the like, can be included. Modifications, additions, subtractions, inversions, correlations, proportional relationships, disproportional relationships, attenuation and/or amplifications to the operations above can be performed in any order and in any combination. It will also be appreciated that in instances where particular operations, methods, steps, processes, or the like, required particular hardware such hardware should be considered as part of apparatus 200 for any such embodiment. For example, as described above where a GPS is used to determine the location of apparatus 200 such appropriate GPS modules and hardware should be considered integral to apparatus 200.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed is:

1. A method comprising:
   during a registration update procedure between a user equipment (UE) and an access and mobility management function (AMF), causing a registration request to be sent for an emergency services fallback request;
   starting a timer when the registration request is sent;
   in response to expiry of the timer, causing an emergency services fallback attempt failure notification to be sent to upper layers of the UE;

in response to the registration request being accepted by the network entity, initiating a service request procedure for emergency services fallback;

in response to receipt of a registration reject response, comprising a predefined cause value indicating that an identity of the UE cannot be derived by a network, to the registration request, (i) stopping the timer, (ii) initiating communication via a cell connected to an evolved packet core or a core network, and (iii) initiating a mobility management procedure.

2. The method according to claim 1, wherein the registration request to be sent further comprises a follow-on request bit defining that no follow-on request is pending.

3. The method according to claim 1, wherein determining the response to the registration request comprises determining that the emergency services fallback request has been accepted in an instance in which a mode has changed or a connection has been established with a network.

4. The method according to claim 3, further comprising: starting a timer when the registration request is caused to be sent; and stopping the timer upon determining that the emergency services fallback request has been accepted.

5. The method according to claim 1, wherein the core network is a Fifth Generation (5G) core network.

6. The method according to claim 5, further comprising: starting a timer when the communication via the cell is caused to be sent; and stopping the timer upon determining that the communication via the cell has been accepted.

7. The method according to claim 1, further comprising: starting a timer when the registration request is caused to be sent;

determining a predefined time limit is expired since starting the timer; and in response to expiration of the predefined time limit, causing an emergency services fallback attempt failure notification to be sent to a client.

8. An apparatus comprising:
at least one processor; and
at least one memory including computer program code, the at least one memory and the computer program code configured to, with the at least one processor, cause the apparatus to:
during a registration update procedure between a user equipment (UE) and an access and mobility management function (AMF), cause a registration request to be sent for an emergency services fallback request;
start a timer when the registration request is sent;
in response to expiry of the timer, cause an emergency services fallback attempt failure notification to be sent to upper layers of the UE;
in response to the registration request being accepted by the network entity, initiate a service request procedure for emergency services fallback;
in response to receipt of a registration reject response, comprising a predefined cause value indicating that an identity of the UE cannot be derived by a network, to the registration request, (i) stop the timer, (ii) initiate communication via a cell connected to an evolved packet core or a core network, and (iii) initiate a mobility management procedure.

9. The apparatus according to claim 8, wherein the registration request to be sent further comprises a follow-on request bit defining that no follow-on request is pending.

10. The apparatus according to claim 8, wherein determining the response to the registration request comprises determining that the emergency services fallback request has been accepted in an instance in which a mode has changed or a connection has been established with a network.

11. The apparatus according to claim 10, wherein the at least one memory and the computer program code are further configured to, with the at least one processor, cause the apparatus to:
start a timer when the registration request is caused to be sent; and
stop the timer upon determining that the emergency services fallback request has been accepted.

12. The apparatus according to claim 8, wherein the core network is a Fifth Generation (5G) core network.

13. The apparatus according to claim 12, wherein the at least one memory and the computer program code are further configured to, with the at least one processor, cause the apparatus to:
start a timer when the communication via the cell is caused to be sent; and
stop the timer upon determining that the communication via the cell has been accepted.

14. The apparatus according to claim 8, wherein the at least one memory and the computer program code are further configured to, with the at least one processor, cause the apparatus to:
start a timer when the registration request is caused to be sent;
determine a predefined time limit is expired since starting the timer; and
in response to expiration of the predefined time limit, cause an emergency services fallback attempt failure notification to be sent to a client.

15. A method comprising:
during a registration update procedure between a user equipment (UE) and an access and mobility management function (AMF), receiving a registration request for an emergency services fallback request at the AMF, wherein a timer is started by the UE when the registration request is sent to the AMF;
in response to expiry of the timer, enabling an emergency services fallback attempt failure notification to be sent to upper layers of the UE by the AMY;
in response to the registration request being accepted by the AMF, enabling initiation of a service request procedure for emergency services fallback; and
in response to the registration request being rejected by the AMF, causing a registration reject response to the registration request to be provided to the UE to enable stopping of the timer in response to receipt of the registration reject response at the UE, indicating the emergency services fallback request has not been accepted and providing a predefined cause value, the predefined cause value indicating that an identity of a user equipment (UE) cannot be derived by a network, enabling initiation of (i) communication via a cell connected to an evolved packet core or a core network and (ii) a mobility management procedure.

16. The method according to claim 15, further comprising:
determining, based on the registration request, that a temporary identity is allocated, and in response starting a timer.

17. The method according to claim 16, further comprising:
receiving a registration complete notification; and
in response to receipt of the registration complete notification, stopping the timer.

18. The method according to claim 15, wherein the response to the registration request defines an acceptance of the emergency services fallback request.

19. The method according to claim 15, wherein the response to the registration request defines a denial of the emergency services fallback request; and the response to the registration request further includes a predefined cause value for the denial.

20. The method according to claim 15, wherein the registration request further comprises a follow-on request bit defining that no follow-on request is pending.

* * * * *

UNITED STATES PATENT AND TRADEMARK OFFICE
CERTIFICATE OF CORRECTION

PATENT NO. : 11,924,798 B2
APPLICATION NO. : 17/249782
DATED : March 5, 2024
INVENTOR(S) : Sung Hwan Won It is certified that error appears in the above-identified patent and that said Letters Patent is hereby corrected as shown below:

In the Claims

In Column 26, Line 42, Claim 15, delete "AMY;" and insert -- AMF; --, therefor.

Signed and Sealed this
Twenty-ninth Day of October, 2024

Katherine Kelly Vidal
Director of the United States Patent and Trademark Office